US008401154B2

(12) United States Patent
Boni et al.

(10) Patent No.: US 8,401,154 B2
(45) Date of Patent: Mar. 19, 2013

(54) EMERGENCY TEXT COMMUNICATIONS

(75) Inventors: Piotr Boni, Providence, RI (US);
Michael Armstrong, Philadelphia, PA
(US); Henning Schulzrinne, Leonia, NJ
(US); Wonsang Song, New York, NY
(US); Jong Yul Kim, New York, NY
(US)

(73) Assignee: Verizon Patent and Licensing Inc.,
Basking Ridge, NJ (US)

( * ) Notice: Subject to any disclaimer, the term of this
patent is extended or adjusted under 35
U.S.C. 154(b) by 737 days.

(21) Appl. No.: 12/612,321

(22) Filed: Nov. 4, 2009

(65) Prior Publication Data

US 2011/0064205 A1 Mar. 17, 2011

Related U.S. Application Data

(60) Provisional application No. 61/243,439, filed on Sep. 17, 2009.

(51) Int. Cl.
*H04M 11/04* (2006.01)
*H04N 7/52* (2011.01)
*H04W 4/12* (2009.01)

(52) U.S. Cl. ......... 379/45; 370/352; 379/85; 455/67.11; 455/404.1; 455/404.2; 455/466; 600/316; 709/204; 709/206; 709/227; 715/753; 715/758; 725/33

(58) Field of Classification Search .................. 370/352; 379/45, 85; 455/404.1, 404.2, 466, 67.11; 600/316; 725/33; 709/204, 206, 227; 715/753, 715/758

See application file for complete search history.

(56) References Cited

U.S. PATENT DOCUMENTS

| | | | | |
|---|---|---|---|---|
| 5,760,820 A * | 6/1998 | Eda et al. | ......................... | 725/33 |
| 7,284,059 B2 * | 10/2007 | Isozu | ........................... | 709/227 |
| 7,469,384 B2 * | 12/2008 | Thompson et al. | ............ | 715/758 |
| 7,472,352 B2 * | 12/2008 | Liversidge et al. | ........... | 715/758 |
| 7,516,410 B2 * | 4/2009 | Thompson et al. | ........... | 715/753 |
| 7,516,411 B2 * | 4/2009 | Beaton et al. | .................. | 715/753 |
| 7,590,696 B1 * | 9/2009 | Odell et al. | ..................... | 709/206 |
| 8,200,756 B2 * | 6/2012 | Karniely | ........................ | 709/204 |
| 8,224,362 B1 * | 7/2012 | Osinga | .......................... | 455/466 |
| 8,250,141 B2 * | 8/2012 | Xiao et al. | ..................... | 709/204 |
| 8,265,672 B1 * | 9/2012 | Osinga | .......................... | 455/466 |
| 8,285,218 B2 * | 10/2012 | Papakostas et al. | ........ | 455/67.11 |
| 2005/0169248 A1 * | 8/2005 | Truesdale et al. | ............. | 370/352 |
| 2006/0172720 A1 * | 8/2006 | Islam et al. | ................. | 455/404.1 |
| 2006/0281982 A1 * | 12/2006 | Grata et al. | ................... | 600/316 |
| 2009/0247111 A1 * | 10/2009 | Sennett et al. | ............. | 455/404.1 |
| 2010/0003946 A1 * | 1/2010 | Ray et al. | ................... | 455/404.1 |
| 2010/0003952 A1 * | 1/2010 | Ray et al. | ................... | 455/404.1 |
| 2010/0003958 A1 * | 1/2010 | Ray et al. | ................... | 455/404.2 |
| 2010/0003959 A1 * | 1/2010 | Coppage et al. | ........... | 455/404.2 |
| 2010/0027766 A1 * | 2/2010 | Shin | ............................... | 379/85 |
| 2010/0297980 A1 * | 11/2010 | Alberth et al. | ............. | 455/404.2 |
| 2010/0297981 A1 * | 11/2010 | Ballantyne et al. | ........ | 455/404.2 |
| 2011/0009086 A1 * | 1/2011 | Poremba et al. | ........... | 455/404.1 |
| 2011/0014892 A1 * | 1/2011 | Hedman et al. | ............ | 455/404.2 |
| 2011/0064205 A1 * | 3/2011 | Boni et al. | ...................... | 379/45 |
| 2011/0143786 A1 * | 6/2011 | Fan et al. | ....................... | 455/466 |

OTHER PUBLICATIONS

Intelligent Transport Systems, Next Generation 9-1-1 (NG9-1-1) System Initiative, "Architecture Analysis Report", Version 1.0, Nov. 2007, 118 pages.
Intelligent Transport Systems, Next Generation 9-1-1 (NG9-1-1) System Initiative, "System Description and Requirements Document", Version 2.0, Oct. 10, 2007, 154 pages.
Peter Svensson, "Iowa 911 Call Center Becomes First to Accept Texts", The Associated Press, Aug. 5, 2009, 2 pages.
Wikipedia, "Next Generation 9-1-1", http://en.wikipedia.org/wiki/NG911, Jun. 25, 2009, 4 pages.

* cited by examiner

*Primary Examiner* — Gerald Gauthier

(57) ABSTRACT

A system includes one or more devices connected to or within one of a group of emergency services networks. The one or more devices may generate a text message that includes information identifying a user device, information identifying a geographic location of the user device, and information identifying a particular emergency services network of the group of emergency services networks; establish, based on the text message, a text-based communication session between the user device and a call taker device within the particular emergency services network; store session information regarding the text-based communication session; receive a subsequent text message; and transmit the subsequent text message to the call taker device based on the session information.

24 Claims, 14 Drawing Sheets

600

610 620 630

| USER ADDRESS | PSAP ADDRESS | TIMESTAMP |
|---|---|---|
|  |  |  |
|  |  |  |
|  |  |  |
| ⋮ | ⋮ | ⋮ |
|  |  |  |

| USER ADDRESS | EMERGENCY CALL TAKER ADDRESS | CALL TAKER STATUS |
|---|---|---|
|  |  |  |
|  |  |  |
| ⋮ | ⋮ | ⋮ |
|  |  |  |

FIG. 7

1100 → request line — MESSAGE urn:service:sos SIP/2.0
1110 header fields
1120
- From: <sip:caller@verizon.com>;tag=e778529
- To: <urn:service:sos>
- Route: <sip:esrp.ng911.gov;lr>
- Geolocation:cid:caller@verizon.com
    ;inserted-by="caller@verizon.com"
- Content-Length: 1123

--------------------------
Content-Type:text/plain message
1130

Please Help Me!!
--------------------------
Content-ID: caller@verizon.com
Content-Type: application/pidf+xml

PIDF-LO
1140

```
<presence>
 <tuple id="id94954">
  <status>
   <gp:geopriv>
    <gp:location-info>
    <cl:civicAddress>
     <cl:country>US</cl:country>
      <cl:A1>NY</cl:A1>
      <cl:A3>New York<cl:A3>
      <cl:A6>Amster Ave</cl:A6>
      <cl:HNO>1003</cl:HNO>
      <cl:PC>10027</cl:PC>
     </cl:civicAddress>
    </gp:location-info>
    <gp:method>Manual</gp:method>
   </gp:geopriv>
  </status>
 </tuple>
</presence>
```

FIG. 11

EMERGENCY TEXT COMMUNICATIONS

RELATED APPLICATION

This application claims priority to U.S. Provisional Application No. 61/243,439, filed Sep. 17, 2009, the entire contents of which are incorporated herein by reference.

BACKGROUND

In today's 9-1-1 environment, the public can primarily make only emergency voice calls and Teletype calls (by deaf or hearing impaired persons). When a 9-1-1 call is made, typically only minimal data is delivered with the call, such as Automatic Number Identification (ANI), subscriber name, and Automatic Location Identification, when available.

The Next Generation 9-1-1 (NG9-1-1) system is an Internet Protocol/Session Initiation Protocol (IP/SIP)-based emergency communication system proposed by the National Emergency Number Association. NG9-1-1 provides media convergence and data integration that is not possible with the current emergency communication system. For example, it is not possible to send text, a picture, or a video to an emergency call taker using the current 9-1-1 system, but the NG9-1-1 system is designed to allow such multimedia communications. Also, additional data, such as floor plans, health records, or telematics data, can be delivered to the emergency call taker when this data is needed.

It has been envisioned that the NG9-1-1 environment may permit the public to make voice, text, or video emergency "calls" from any communications device via IP-based networks. Currently, however, no one has discovered how text communications, such as instant messages (IMs) and short message service (SMS) messages, can be integrated into a 9-1-1 environment.

BRIEF DESCRIPTION OF THE DRAWINGS

FIG. 6 is a diagram of an exemplary session table that may be maintained by an emergency services routing proxy (ESRP) within the emergency services network of FIG. 1;

FIG. 7 is a diagram of an exemplary session table that may be maintained by a PSAP within the emergency services network of FIG. 1;

FIG. 11 is a diagram of an exemplary message that may be transmitted within the network of FIG. 8;

DETAILED DESCRIPTION OF PREFERRED EMBODIMENTS

The following detailed description refers to the accompanying drawings. The same reference numbers in different drawings may identify the same or similar elements.

Text communication is becoming increasingly popular, with an estimated 71 million instant message (IM) users in the United States alone in 2007. In 2008, short message service (SMS) users, in the United States, sent approximately 600 billion SMS messages, which was an increase of approximately 950% over the number of SMS messages sent in 2005. As such, text communication has become a major communication method.

In some emergency situations, voice communications may be unavailable, thereby limiting the ability of the public to request help. For example, during Hurricane Katrina, voice communication was unavailable due to an overloading of the voice communication network. However, SMS messages could still be sent during this time.

Implementations, described herein, may provide text-based emergency services. For example, these implementations may provide systems and/or methods for permitting the public to request emergency services using text messages, such as IMs and/or SMS messages. These implementations may provide location information, regarding the location of the person initiating the request for emergency services, within the text message, so that the emergency call taker can quickly and accurately identify the geographic location of the emergency. These implementations may also maintain session information in one or more devices, within in the network, so that subsequent text messages from the same person get routed to the same emergency call taker.

Figure 1:
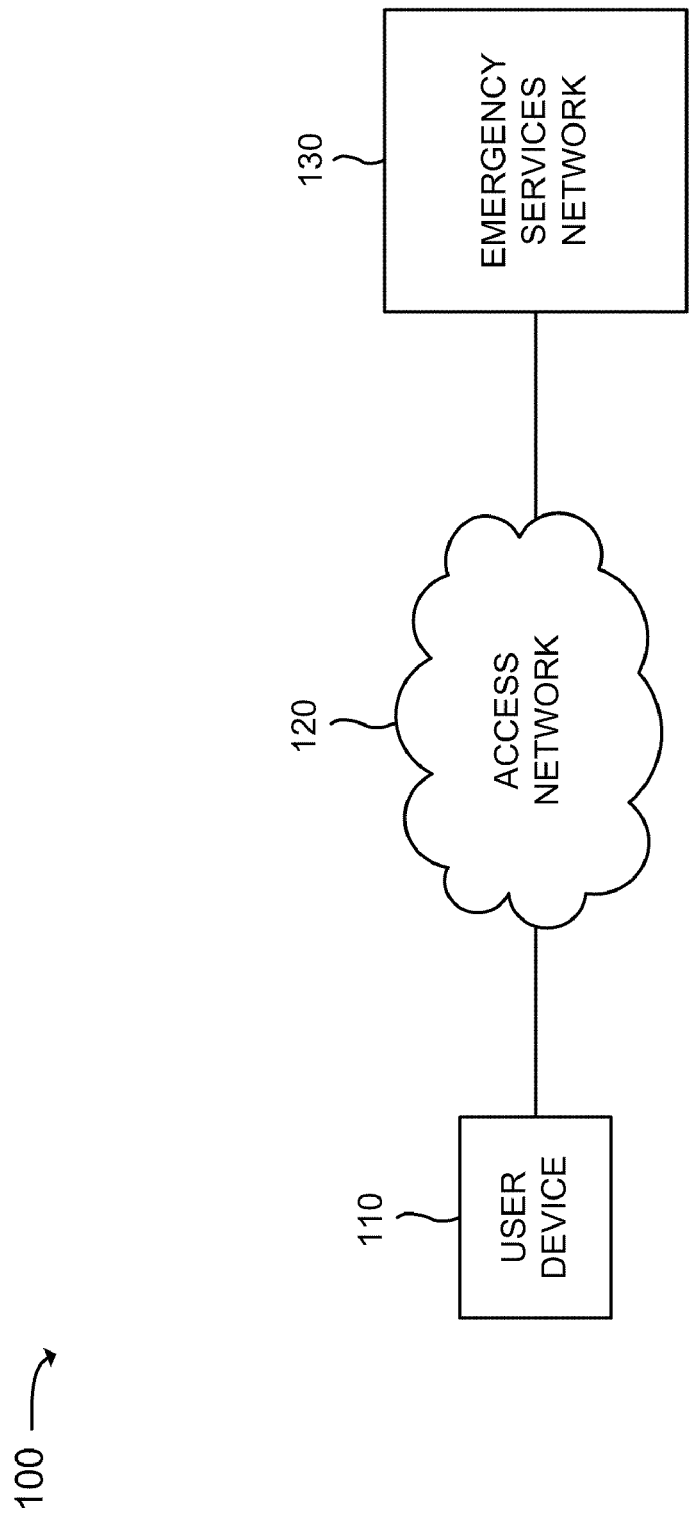
FIG. 1 is a diagram that illustrates an exemplary environment in which systems and/or methods described herein may be implemented.

FIG. 1 is a diagram that illustrates an exemplary environment 100 in which systems and/or methods described herein may be implemented. Environment 100 may include user device 110 connected to an access network 120 to which an emergency services network 130 also connects. In practice, environment 100 may include more, fewer, different, or differently arranged devices than are shown in FIG. 1. For example, environment 100 may include multiple emergency services networks 130, where each emergency services network 130 may be responsible for a particular geographic area.

Further, while FIG. 1 shows direct connections, any of these connections may be wired or wireless, and any of these connections can be indirectly made via a network, such as a local area network (LAN), a wide area network (WAN) (e.g., the Internet), a telephone network (e.g., the Public Switched Telephone Network (PSTN) or a cellular network), or a combination of networks.

User device 110 may include a communication device of an end-user, such as a desktop computer, a laptop, a mobile communication device (e.g., a mobile phone or a personal digital assistant (PDA)), or another type of communication device. As described herein, a user may initiate a request for emergency services by sending a text communication using user device 110. Accordingly, user device 110 may include software for performing text-based communication, such as an IM application or a SMS application.

Access network 120 may include any type of network via which user device 110 may connect to emergency services network 130. For example, access network 120 may include a LAN, a WAN (e.g., the Internet), a metropolitan area network (MAN), an ad hoc network, a telephone network (e.g., a PSTN, a cellular network, a voice-over-IP (VoIP) network), a text network (e.g., an IM network or a SMS network), or a combination of networks. In one implementation, access network 120 may include devices (not shown) that may facilitate the establishment of communications between user device 110 and emergency services network 130.

Emergency services network 130 may include a collection of devices that provides emergency services, such as 9-1-1 services. In one implementation, the devices of emergency services network 130 may form an IP-based network.

Figure 2:
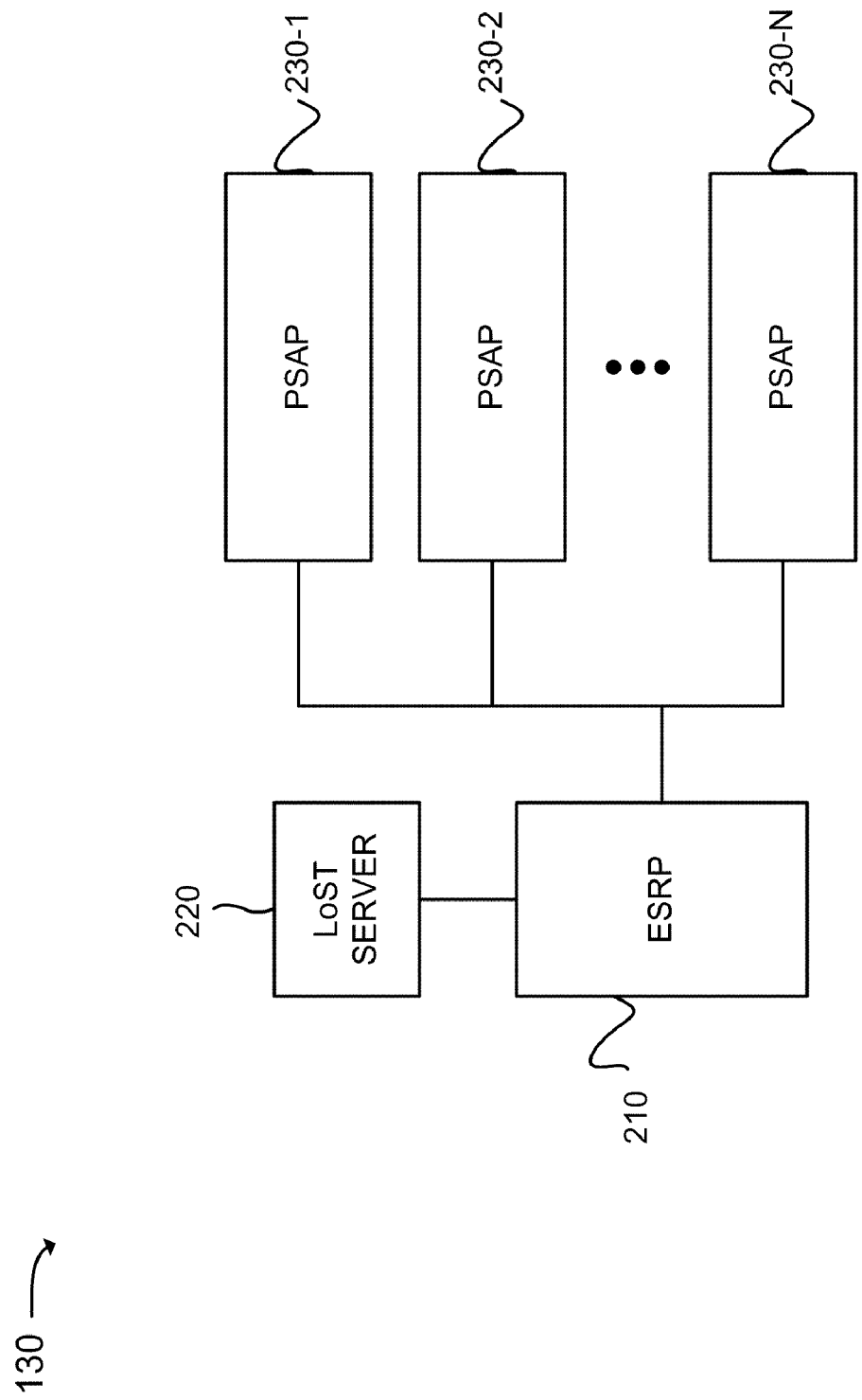
FIG. 2 is a diagram of exemplary devices of the emergency services network of FIG. 1.

FIG. 2 is a diagram of exemplary devices of emergency services network 130. As shown in FIG. 2, emergency services network 130 may include an emergency services routing proxy (ESRP) 210, a location-to-service translation (LoST) server 220, and a group of public safety answering points (PSAPs) 230-1, 230-2, . . . , 230-N (collectively referred to as "PSAPs 230," and individually as "PSAP 230") (where N>1), as defined by the National Emergency Number Association (NENA). While FIG. 2 shows a particular number and arrangement of devices, emergency services network 130 may include fewer, additional, different, or differently arranged devices. For example, emergency services network 130 may include multiple ESRPs 210, where each ESRP 210 may be assigned to a different geographic area and may be responsible for its own group of PSAPs 230. Also, a function described as being performed by one of the devices may be performed by another one of the devices.

ESRP 210 may include a device, or a collection of devices, that is responsible for sending emergency communication (e.g., text or voice communication) to an appropriate one of PSAPs 230. In one implementation, ESRP 210 may include a SIP routing device, such as a SIP router, that makes routing decisions for a received emergency communication. ESRP 210 may identify the appropriate PSAP 230 to which to send the received emergency communication based on, for example, the geographic location of the user who initiated the emergency communication.

LoST server 220 may include a device, or a collection of devices, that is responsible for mapping the geographic location of a user to an address of one of the PSAPs 230. For example, LoST server 220 may maintain a mapping table, or the like, that may facilitate the mapping of geographic locations to addresses of PSAPs 230. In one implementation, ESRP 210 may send a request to LoST server 220, where the request may include the geographic location of a user device (e.g., user device 110) and request identification of one of PSAPs 230 that corresponds to the geographic location of the user device. LoST server 220 may identify a PSAP 230 using an address, such as an IP address or a SIP uniform resource identifier (URI), associated with the PSAP 230.

Figure 3:
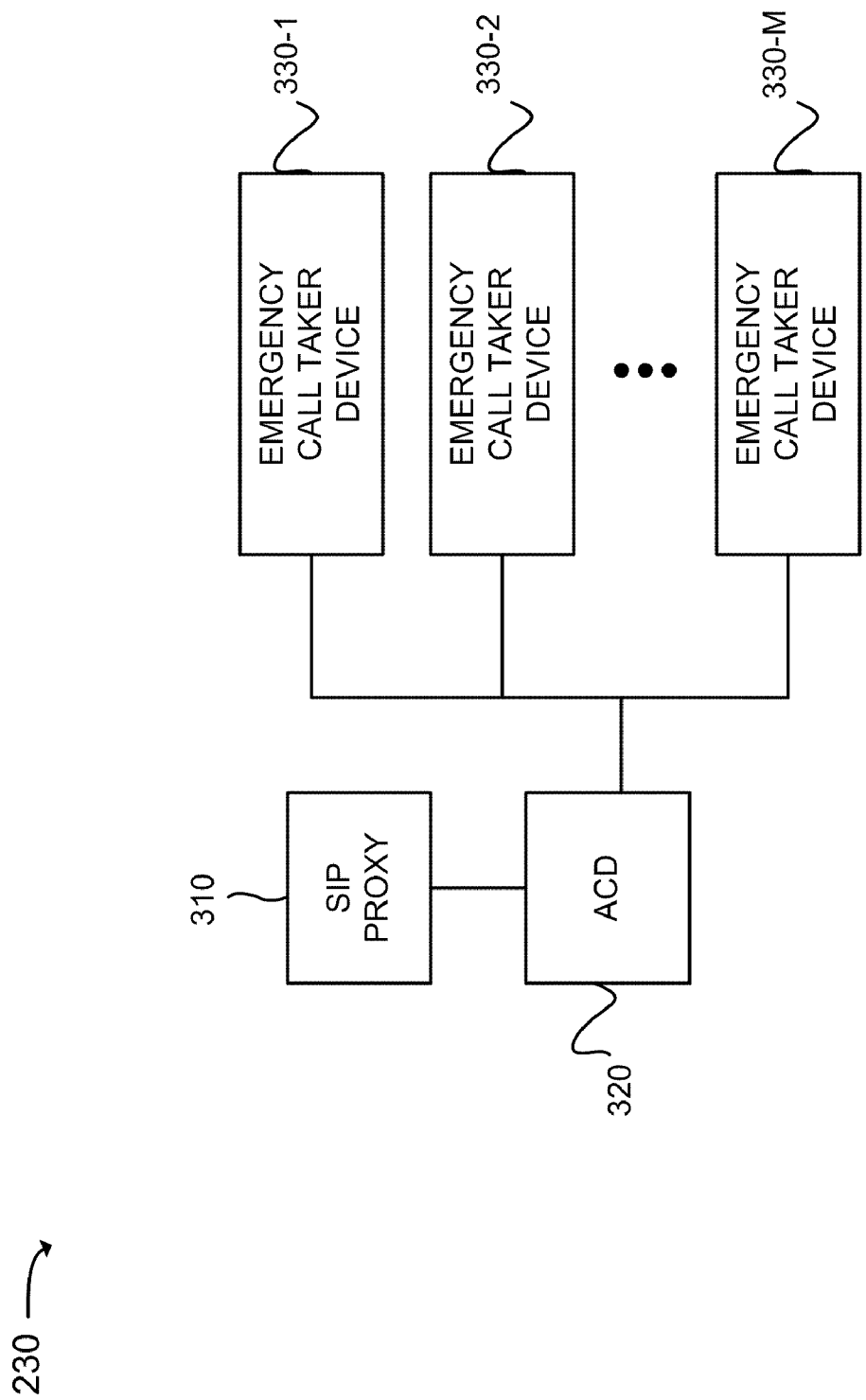
FIG. 3 is a diagram of exemplary devices of a public safety answering point (PSAP) of FIG. 2.

Each of PSAPs 230 may include a collection of devices that forms a call center responsible for answering requests for emergency services. FIG. 3 is a diagram of exemplary devices of a PSAP 230. As shown in FIG. 3, PSAP 230 may include a SIP proxy 310, an automatic call distributor (ACD) 320, and a group of emergency call taker devices 330-1, 330-2, . . . , 330-M (collectively referred to as "emergency call taker devices 330," and individually as "emergency call taker device 330") (where M>1). While FIG. 3 shows a particular number and arrangement of devices, PSAP 230 may include fewer, additional, different, or differently arranged devices. Also, a function described as being performed by one of the devices may be performed by another one of the devices.

SIP proxy 310 may include a device, or a collection of devices, that is responsible for receiving emergency communication (e.g., text or voice communication) and sending the emergency communication to ACD 320 for routing to an appropriate one of emergency call taker devices 330. ACD 320 may include a device, or a collection of device, that is responsible for routing an emergency communication to an appropriate one of emergency call taker devices 330. In one implementation, ACD 320 may use local policy rules to make routing decisions for a received emergency communication. These local policy rules may be based on availability of a call taker, work load of a call taker, time-of-day, and/or other criteria.

Each of emergency call taker devices 330 may include a device, or a collection of devices, that a call taker may use to process an emergency communication. In one implementation, an emergency call taker device 330 may include some form of stationary or mobile communication device, such as a personal computer, a laptop, or a mobile device (e.g., a cell phone, a PDA, or the like). Call taker device 330 may include an application that facilitates the reception and transmission of text messages, such as SIP messages. A call taker may use emergency call taker device 330 to receive and appropriately process a request for emergency services, such as a text message.

Figure 4:
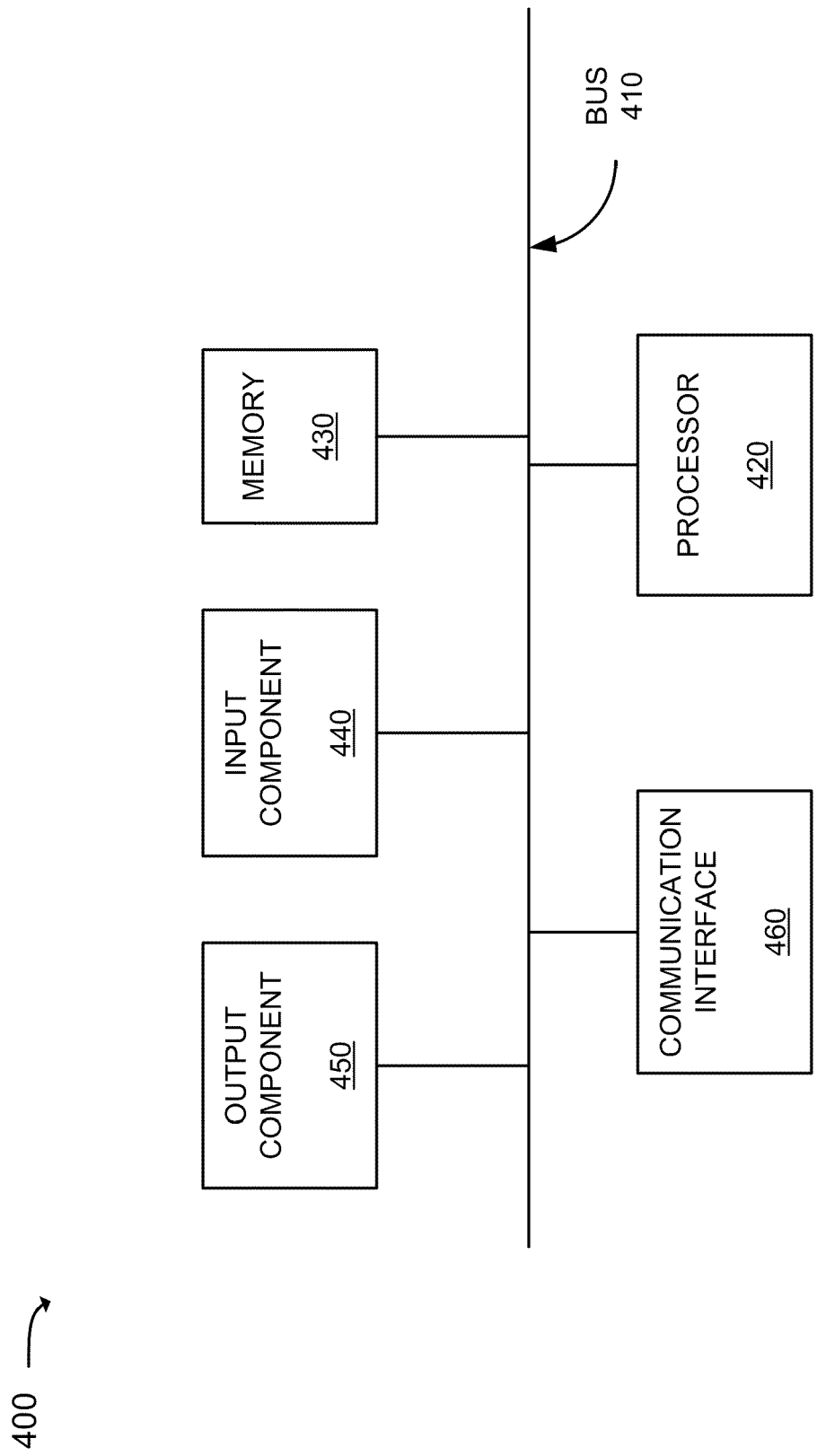
FIG. 4 is a diagram of exemplary components of a device within the environment of FIG. 1.

FIG. 4 is a diagram of exemplary components of a device 400 within environment 100 (FIG. 1). For example, device 400 may correspond to user device 110, ESRP 210, LoST server 220, SIP proxy 310, ACD 320, and/or emergency call taker device 330.

As shown in FIG. 4, device 400 may include a bus 410, a processor 420, a memory 430, an input component 440, an output component 450, and a communication interface 460. In another implementation, device 400 may include additional, fewer, different, and/or differently arranged components. Bus 410 may include a path that permits communication among the components of device 400.

Processor 420 may include a processor, a microprocessor, or processing logic (e.g., an application specific integrated circuit (ASIC) or a field programmable gate array (FPGA)) that may interpret and execute instructions. Memory 430 may include any type of dynamic storage device that may store information and instructions for execution by processor 420, any type of non-volatile storage device that may store information for use by processor 420, and/or any type of removable memory device (e.g., flash memory).

Input component 440 may include a mechanism that permits an operator to input information into device 400, such as a keyboard, a keypad, a button, a switch, etc. Output component 450 may include a mechanism that outputs information to the operator, such as a display, a speaker, a light emitting diode (LED), etc. Communication interface 460 may include any transceiver-like mechanism that enables device 400 to communicate with other devices and/or systems. For example, communication interface 460 may include an Ethernet interface, an optical interface, a coaxial interface, a wireless interface, or the like.

As will be described in detail below, device 400 may perform certain operations relating to the requesting and/or providing of emergency services. Device 400 may perform these operations in response to processor 420 executing software instructions contained in a computer-readable medium, such as memory 430. A computer-readable medium may be defined as a physical or logical memory device. A logical memory device may include memory space within a single physical memory device or spread across multiple, physical memory devices.

The software instructions may be read into memory 430 from another computer-readable medium or from another device via communication interface 460. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Figure 5:
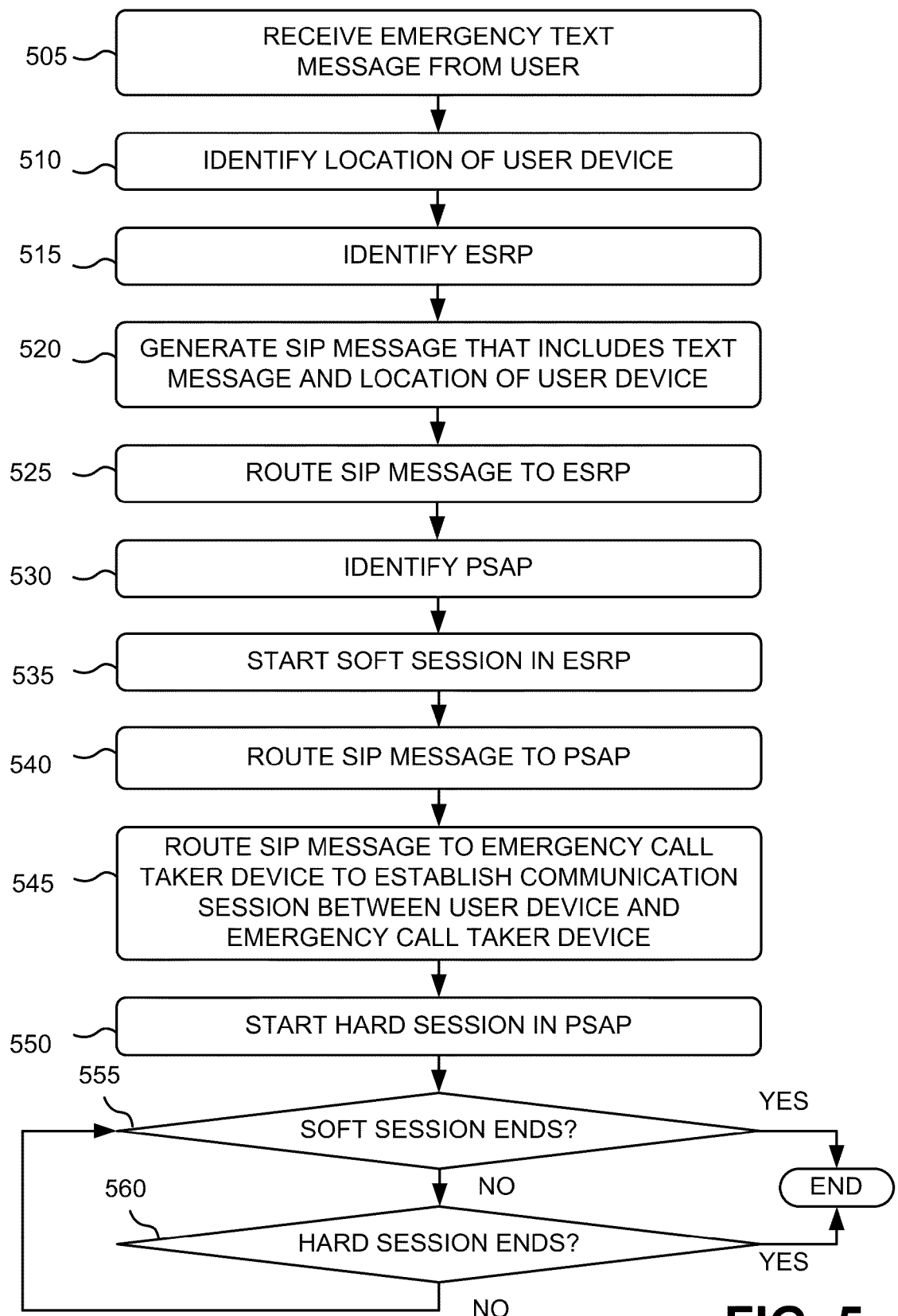
FIG. 5 is a flowchart of an exemplary process for permitting text-based requests for emergency services.

Implementations, described herein, may permit text-based communications to be used to request emergency services. FIG. 5 is a flowchart of an exemplary process for permitting text-based requests for emergency services. In one implementation, the process of FIG. 5 may be performed by user device 110 and/or one or more devices within emergency services network 130 and/or access network 120.

The process of FIG. 5 may include receiving an emergency text message from a user (block 505). For example, the user may initiate, or activate, on user device 110, a particular application for text-based communication, such as an IM application or a SMS application. The particular application may present a user interface via which the user may enter the text for the text message and may identify the text message as a request for emergency services. In one implementation, the user interface may present an object (e.g., an icon, a menu item, etc.) that may be selected by the user to identify the text message as a request for emergency services. In another implementation, the user may identify a particular destination for the text message, and this particular destination may be used to identify the text message as a request for emergency services.

The geographic location of user device 110 may be identified (block 510). Several techniques may be used to identify the geographic location of user device 110, and thus, the geographic location of the user. For example, the user may enter the geographic location into user device 110 either via the particular application, described above, or via another application or user interface. Alternatively, or additionally, the location of user device 110 may be determined from a link layer discovery protocol-media endpoint discovery (LLDP-MED)-capable network switch. LLDP-MED is a link layer protocol that allows a network device to discover a geographic location. When requested, a LLDP-MED-capable network switch may send the geographic location of an end device to the port to which the end device is attached. Alternatively, or additionally, the location of user device 110 may be determined using global positioning system (GPS) or global navigation satellite system (GNSS) signals. In this case, user device 110 may include a GPS or a GNSS receiver. Alternatively, or additionally, the location of user device 110 may be determined using a network-centric solution, such as a mobile position center (MPC) and position determining equipment (PDE) in a cellular network. In this case, a network device may include, or interact with, the MPC and PDE, to determine the location of user device 110. Alternatively, or additionally, the location of user device 110 may be determined using another technique, such as tower (e.g., cellular tower) triangularization. The geographic location information may be expressed in a particular format, whether as a set of latitude and longitude coordinates, as a set of GPS coordinates, as a particular street address, or in another format with a level of specificity to identify the particular geographic location of user device 110.

An ESRP 210, to which to route the text message, may be identified (block 515). In one implementation, the particular ESRP 210, to which to route the text message, may be identified based on the geographic location of user device 110. For example, a LoST server, or the like, may be queried to identify an emergency services network 130, or an ESRP 210 within an emergency services network 130, to handle the text message from a user device 110 in a particular geographic location.

A SIP message, which includes the text message and the location of user device 110, may be generated (block 520). In one implementation, the generation of the SIP message may include the conversion, or encapsulation, of the text message (e.g., an IM or a SMS message) into a SIP message. The SIP message may include information that identifies the SIP message as a request for emergency services, so as to distinguish the SIP message from non-emergency SIP messages. For example, the information, which identifies the SIP message as a request for emergency services, may include a particular identifier, such as a particular URI (e.g., "urn: service:sos"). The SIP message may also include information in the header of the SIP message, such as information (e.g., an address) identifying ESRP 210 to which the SIP message is to be routed, and information (e.g., an address) identifying user device 110 or a device associated with user device 110 (e.g., a gateway or another network device). The SIP message may further include information in the body of the SIP message, such as information identifying the geographic location of user device 110. In one implementation, the geographic location information may be included in a particular format, such as in the presence information data format location object (PIDF-LO) format, which is an XML format used to convey location information.

The SIP message may be routed to ESRP 210 (block 525). For example, access network 120 may route the SIP message to ESRP 210 based on the information in the header of the SIP message.

A PSAP 230, to which to route the text message, may be identified (block 530). For example, ESRP 210 may receive the SIP message and identify the SIP message as an emergency text message based, for example, on the particular identifier (e.g., "urn: service:sos") included in the SIP message. ESRP 210 may then determine how to route the SIP message (e.g., identify which of PSAPs 230 to which to send the SIP message). In one implementation, the particular PSAP 230, to which to route the text message, may be identified based on the geographic location of user device 110. For example, ESRP 210 may query LoST server 220 to identify a PSAP 230, within the same emergency services network 130 as ESRP 210, to handle the text message from user device 110 in a particular geographic location. A PSAP 230 may be identified using, for example, an address (e.g., a SIP URI or an IP address) of a device associated with PSAP 230.

A soft session may be started in ESRP 210 (block 535). For example, ESRP 210 may record, in memory, information regarding the emergency text message to start a soft session. The communication session is identified as "soft" to mean that there is no explicit end to the communication session. Rather, the communication session is timer-based, where a timestamp is set upon the start of the soft session and the soft session ends when a particular amount of time elapses without a subsequent text message, associated with the soft session, being received. A soft session timer function may be used to determine when the particular amount of time has elapsed from a time value associated with the timestamp. The soft session may be useful to facilitate the routing of subsequent text messages, from user device 110, to the same call taker device 330 that received the first (i.e., initial) text message from user device 110.

FIG. 6 is a diagram of an exemplary session table 600 that may be maintained by ESRP 210 (e.g., stored in memory of ESRP 210). As shown in FIG. 6, session table 600 may include a user address field 610, a PSAP address field 620, and a timestamp field 630. In another implementation, session table 600 may include additional, fewer, different, or differently arranged fields.

User address field 610 may store information identifying user device 110. For example, user address field 610 may store a SIP URI of user device 110, an IP address of user device 110, a telephone number of user device 110, or some other identifier (e.g., an International Mobile Equipment Identity (IMEI) or the like) that uniquely identifies user device 110. PSAP address field 620 may store information identifying a PSAP 230. For example, PSAP address field 620 may store an IP address associated with PSAP 230, a SIP URI associated with PSAP 230, or some other identifier that uniquely identifies PSAP 230. Timestamp field 630 may store a timestamp value indicative of a time at which a text message, from a particular user device 110, is received. The session may end when the soft session timer expires (i.e., when a particular amount of time elapses from the timestamp value to a current time value). In one implementation, the timestamp value in timestamp field 630 may be reset (i.e., set to the current time value) when a subsequent message is received from the same user device 110—provided that the soft session timer has not already expired (i.e., that the particular amount of time has not elapsed since the last message from user device 110 was received).

When ESRP 210 starts a soft session, ESRP 210 may store information identifying user device 110 in user address field 610; may store information identifying PSAP 230, to which the SIP message is/was sent, in PSAP address field 620; and may set a current time value in timestamp field 630. ESRP 210 may use the information in user address field 610 and the information in PSAP address field 620 to route, during the communication session, subsequent text messages from user device 110 to the same PSAP 230. Each time ESRP 210 receives a text message from user device 110, ESRP 210 may reset the timestamp value in timestamp field 630 (i.e., set the timestamp value to the current time value). If ESRP 210 does not receive a text message from user device 110 within the particular amount of time, then ESRP 210 may end the soft session by, for example, deleting the information from session table 600. If ESRP 210 receives a new text message from user device 110 after the session ends, then ESRP 210 may treat the new text message as a first message from user device 110 and start a new soft session.

Returning to FIG. 5, the SIP message may be routed to PSAP 230 (block 540). For example, ESRP 210 may modify the header of the SIP message or may encapsulate the SIP message to facilitate the routing of the SIP message to PSAP 230. ESRP 210 may route the SIP message to PSAP 230.

The SIP message may be routed to an emergency call taker device 330 to establish a communication session between user device 110 and emergency call taker device 330 (block 545). For example, SIP proxy 310 may receive the SIP message and forward the SIP message to ACD 320. ACD 320 may analyze the SIP message and route the SIP message to an appropriate emergency call taker device 330. ACD 320 may use local policy rules to identify the appropriate emergency call taker device 330. These local policy rules may be based on availability of a call taker, work load of a call taker, time-of-day, or other criteria.

A hard session may be started in PSAP 230 (block 550). For example, ACD 320 (or another component in PSAP 230) may record, in memory, information regarding the emergency text message to start a hard session. The communication session is identified as "hard" to mean that there is an explicit end to the communication session. For example, a communication session may be started upon receipt of a first text message from a particular user device 110 and may be ended when instructed from a particular call taker to whom the text message, from the particular user device 110, had been sent. The hard session may be useful to facilitate the routing of subsequent text messages, from user device 110, to the same call taker device 330 that received the first (i.e., initial) text message from user device 110.

FIG. 7 is a diagram of an exemplary session table 700 that may be maintained by ACD 320 (e.g., stored in memory of ACD 320). While the description to follow will describe session table 700 as being maintained by ACD 320, in another implementation, session table 700 may be maintained by another component, or a combination of components, of PSAP 230. As shown in FIG. 7, session table 700 may include a user address field 710, an emergency call taker address field 720, and a call taker status field 730. In another implementation, session table 700 may include additional, fewer, different, or differently arranged fields.

User address field 710 may store information identifying user device 110. For example, user address field 710 may store a SIP URI of user device 110, an IP address of user device 110, a telephone number of user device 110, or some other identifier that uniquely identifies user device 110. Emergency call taker address field 720 may store information identifying an emergency call taker device 330. For example, emergency call taker address field 720 may store an address (e.g., a SIP URI or an IP address) associated with emergency call taker device 330, a URI associated with emergency call taker device 330, or some other identifier that uniquely identifies emergency call taker device 330. Call taker status field 730 may identify the status of an emergency call taker associated with an emergency call taker device 330. For example, the status may reflect "available" to reflect that the emergency call taker is available to receive an emergency text message, "active" to reflect that the emergency call taker is engaged in a communication session and available to receive subsequent text messages associated with the communication session, or "busy" to reflect that the emergency call taker is unavailable to receive any emergency text messages.

When ACD 320 starts a hard session, ACD 320 may store information identifying user device 110 in user address field 710; may store information identifying emergency call taker device 330, to which the SIP message is/was sent, in emergency call taker address field 720; and may update the emergency call taker's status to "active." ACD 320 may use the information in user address field 710 and the information in emergency call taker address field 720 to route, during the communication session, subsequent text messages from user device 110 to the same emergency call taker device 330. ACD 320 maintains the information in session table 700, for the communication session, until explicitly instructed by emergency call taker device 330 to end the session. When the session ends, ACD 320 may delete the information from session table 700.

Returning to FIG. 5, once the communication session has been established between user device 110 and emergency call taker device 330, the emergency call taker may process the request for emergency services. For example, the emergency call taker may identify the user's location and identify the nature of the emergency. During the communication session, subsequent text messages may be exchanged between user device 110 and emergency call taker device 330. Subsequent text messages, from user device 110, may be routed to the same emergency call taker device 330 using information in session tables 600 and 700.

If the soft session or the hard session ends (block 555—YES, block 560—YES), then the process of FIG. 5 may end. As described above, the soft session may end when no text message, from user device 110, is received by ESRP 210 within a particular amount of time. As also described above, the hard session may end when explicitly instructed to end by emergency call taker device 330. In either situation, user device 110 and/or emergency call taker device 330 may be notified of the end of the session. Also, any subsequent emergency text message transmitted by user device 110 may be processed as a first (i.e., initial) request for emergency services and may be newly routed to an emergency call taker device 330, which may not be the same emergency call taker device 330 that received the prior emergency text message(s).

While a series of blocks has been described with regard to FIG. 5, the order of the blocks may be modified in other implementations. Further, non-dependent blocks may be performed in parallel. For example, it has been described that the geographic location of user device 110 and the appropriate emergency services network 130, or ESRP 210, to which to send a text message are determined after receiving the emergency text message from the user. In another implementation, one or both of these determinations may be performed prior to receiving an emergency text message. For example, one or both of these determinations may be periodically performed or performed when the application, for text-based communication, is initiated or activated.

Two exemplary implementations, of the above-identified systems and methods, include IM-based and SMS-based requests for emergency services. While the description to follow will describe these two exemplary implementations in more detail, the systems and methods, described herein, are not limited to IM-based or SMS-based requests for emergency services, and may also apply to other forms of real-time, or near-real-time, text-based communications, such as e-mail-based communications.

Figure 8:
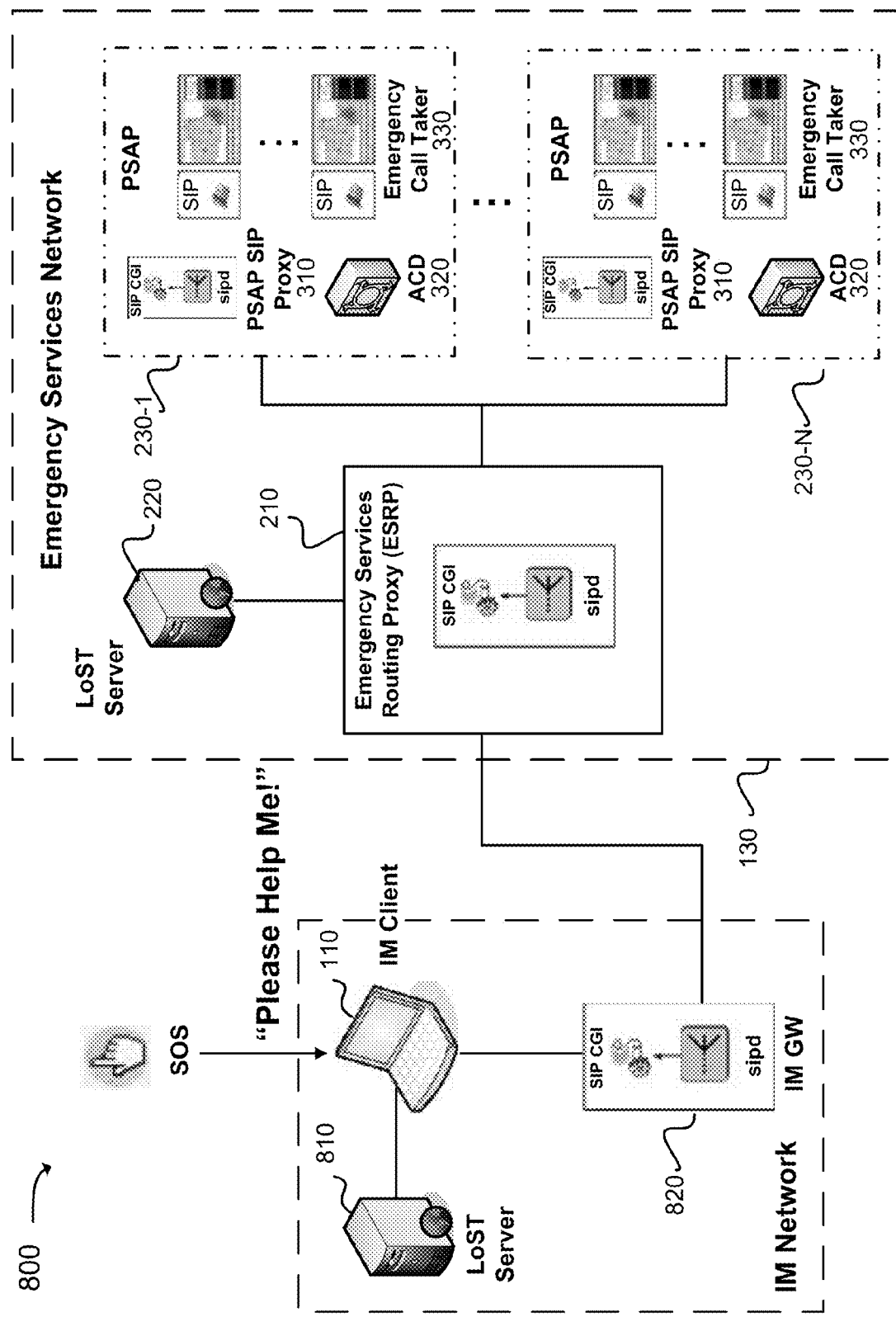
FIG. 8 is a diagram of an exemplary network that may provide instant message (IM)-based emergency services.

FIG. 8 is a diagram of an exemplary network 800 that may provide IM-based emergency services. Network 800 may include user device 110 connected to emergency services network 130. Emergency services network 130 may include similar devices as described above with regard to FIGS. 1-3. As shown in FIG. 8, network 800 may include additional devices, such as a LoST server 810 and an IM gateway 820.

In the example of FIG. 8, assume that user device 110 takes the form of a laptop and includes an IM application that has been modified to handle requests for emergency services. For example, the IM application may be configured to determine the location of user device 110, identify the appropriate emergency services network 130 to which to send a request for emergency services, and generate a text message, which may be in the form of a SIP message.

LoST server 810 may include a device, or a collection of devices, that is responsible for mapping the geographic location of a user to an address of an emergency services network 130, or an ESRP 210 within an emergency services network 130. For example, LoST server 810 may maintain a mapping table, or the like, that may facilitate the mapping of geographic locations to addresses of emergency services networks 130 or ESRPs 210. In one implementation, user device 110 may send a request to LoST server 810, where the request may include the geographic location of a user device 110 and request identification of one of emergency services networks 130, or ESRPs 210, that corresponds to the geographic location of user device 110. LoST server 810 may identify an emergency services network 130, or ESRP 210, using an address, such as a SIP URI or another service contact URI, associated with the emergency services network 130, or ESRP 210.

IM gateway 820 may include a device, or a collection of devices, that is responsible for receiving text communication and forwarding the text communication to an appropriate one of emergency services networks 130. In one implementation, IM gateway 820 may receive a text message in a particular format or protocol, such as the Extensible Messaging and Presence Protocol (XMPP), from user device 110, convert the text message to a SIP message, and forward the SIP message to the appropriate emergency services network 130. In another implementation, IM gateway 820 may receive a SIP message from user device 110 and forward the SIP message to the appropriate emergency services network 130.

Figure 9:
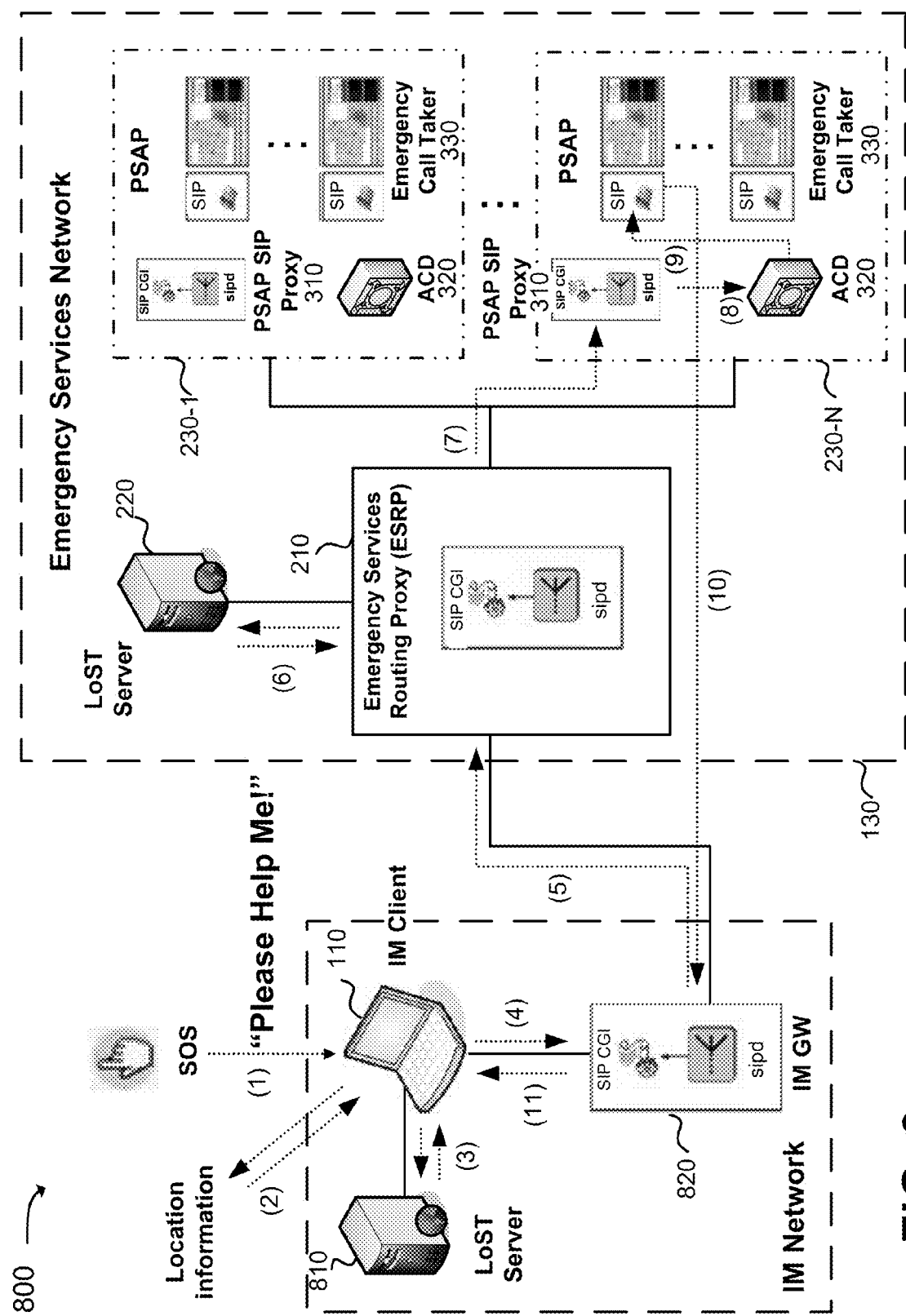
FIG. 9 is a diagram of exemplary operations that may be performed within the network of FIG. 8.

FIG. 9 is a diagram of exemplary operations that may be performed within network 800. Assume that a user of user device 110 is in need of emergency services. The user may activate the IM application on user device 110, initiate a request for emergency services, initiate a logical session, and enter text for the request, as shown as (1) in FIG. 9. The IM application may obtain location information regarding the geographic location of user device 110, as shown as (2) in FIG. 9. The location information may be obtained from the user, from a LLDP-MED-capable network switch, from a GPS or GNSS receiver, from tower triangularization, or from another source.

Figure 10:
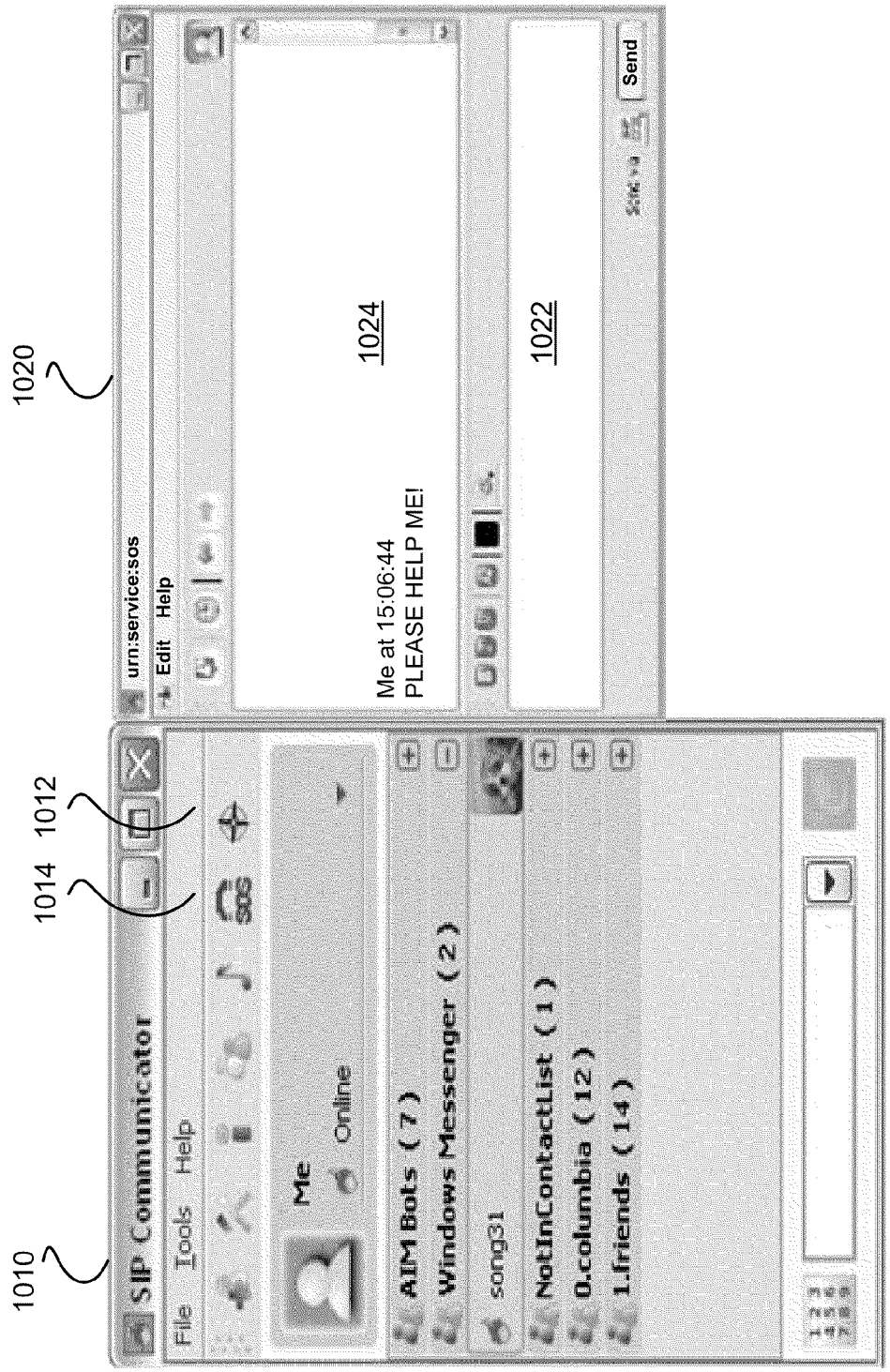
FIG. 10 is a diagram of an exemplary user interface that may be presented on a user device within the network of FIG. 8.

FIG. 10 is a diagram of an exemplary user interface 1010 that may be presented on user device 110. As shown in FIG. 10, user interface 1010 may include visual elements similar to standard IM applications. Unlike standard IM applications, however, user interface 1010 may include a location button 1012 and an emergency button 1014. Location button 1012, when selected by the user, may cause the IM application to obtain location information regarding the geographic location of user device 110. In one implementation, selection of location button 1012 may cause a separate user interface to be presented (not shown), where the separate user interface may permit the user to enter the location information. In another implementation, selection of location button 1012 may cause the IM application to query a LLDP-MED-capable network switch for the location information. In yet another implementation, selection of location button 1012 may cause the IM application to obtain the location information in another way (e.g., by querying a GPS or GNSS receiver, by performing tower triangularization, etc.). In a further implementation, location button 1012 may be used for manual entry of the location information, and if the user does not select location button 1012, the IM application may automatically obtain the location information by querying a LLDP-MED-capable network switch, a GPS or GNSS receiver, or the like.

Emergency button 1014, when selected, may cause dialog window 1020 to be presented. Dialog window 1020 may be an IM dialog window for sending IMs to emergency services network 130. A logical session may begin when dialog window 1020 is presented. The logical session may exist while dialog window 1020 is open and end when dialog window 1020 is closed.

As shown in FIG. 10, dialog window 1020 may include current message area 1022 and prior message area 1024. Current message area 1022 may accept text input from the user. The text input, received in current message area 1022, may be used to form and send a text message. Prior message area 1024 may include text of a text message previously sent or received by the user. Prior message area 1024 may also include the time and/or date at which the previous text message was sent or received.

Returning to FIG. 9, the IM application, on user device 110, may query LoST server 810 to identify an emergency services network 130, or an ESRP 210, to which to send the request for emergency services, as shown as (3) in FIG. 9. The query, to LoST server 810, may include the location information regarding the geographic location of user device 110. LoST server 810 may perform a look-up based on the location information to identify the appropriate emergency services network 130, or ESRP 210, to handle the request for emergency services.

The IM application, on user device 110, may generate a text message, which may be in the form of a SIP message, based on the text input entered by the user. The SIP message may include a header and a body. In one implementation, the request-URI and the SIP To header fields may be set as, for example, urn: service:sos, in order to distinguish an emergency SIP message from non-emergency SIP messages. The SIP From header field may be set as the address (e.g., a SIP URI) of user device 110. The SIP Route header field may be set as the address (e.g., a SIP URI) of emergency services network 130, or ESRP 210, to which the SIP message is to be sent. The text, entered by the user, and the location information, regarding the geographic location of user device 110, may be inserted into the SIP message body. As described above, the location information may be embedded in the SIP message body as PIDF-LO data. The SIP Geolocation header field may also include information to indicate that the SIP message includes location information.

FIG. 11 is a diagram of an exemplary SIP message 1100. As shown in FIG. 11, SIP message 1100 may include a request line 1110, header fields 1120, message data 1130, and PIDF-LO data 1140. In another implementation, SIP message 1100 may include additional, fewer, different, or differently arranged data items.

Request line 1110 may identify the message as a request for emergency services. Header fields 1120 may include information regarding the user device that created SIP message 1100 (From field), information identifying to where SIP message 1100 is to be sent (To and Route fields), information indicating that SIP message 1100 includes location information (Geolocation field), and information regarding the length of SIP message 1100 (Content-Length field). Message data 1130 may include the text that the user entered for SIP message 1100. PIDF-LO data 1140 may include the location information.

Returning to FIG. 9, user device 110 may send the text message to IM gateway 820, as shown as (4) in FIG. 9. If the text message is not a SIP message, then IM gateway 820 may convert the text message into a SIP message. In any event, IM gateway 820 may forward the SIP message to ESRP 210 within emergency services network 130, as shown as (5) in FIG. 9. ESRP 210 may receive the SIP message and identify the SIP message as a request for emergency services. ESRP 210 may send a request to LoST server 220 for the identification of a PSAP 230 to which to send the SIP message, as shown as (6) in FIG. 9. LoST server 220 may receive the request and perform a look-up operation based, for example, on the location information. LoST server 220 may identify a PSAP 230 based, for example, on the location information, and return information identifying PSAP 230 to ESRP 210, as shown as (6) in FIG. 9.

As described above, ESRP 210 may also start a soft session. For example, ESRP 210 may record, in memory (e.g., within session table 600 (FIG. 6)), information regarding the SIP message, such as information identifying user device 110 and information identifying PSAP 230. ESRP 210 may also reset a timestamp value for the soft session (i.e., set the timestamp value to a current time value).

ESRP 210 may route the SIP message to the identified PSAP 230, as shown as (7) in FIG. 9. The SIP message may be received by SIP proxy 310 of the identified PSAP 230, as shown as (7) in FIG. 9. SIP proxy 310 may forward the SIP message to ACD 320, as shown as (8) in FIG. 9. ACD 320 may process the SIP message to identify an appropriate one of emergency call taker devices 330 to handle the SIP message using, for example, local policy rules. ACD 320 may also start a hard session by, for example, storing information regarding the SIP message, such as information identifying user device 110 and information identifying emergency call taker device 330, in memory (e.g., within session table 700 (FIG. 7)).

ACD 320 may forward the SIP message to emergency call taker device 330, as shown as (9) in FIG. 9, thereby establishing a communication session between user device 110 and emergency call taker device 330. Emergency call taker device 330 may receive the SIP message and present information regarding the SIP message to the call taker. Initially, emergency call taker device 330 may request the call taker to indicate the call taker's acceptance of the SIP message. Emergency call taker device 330 may present detailed information regarding the SIP message.

Figure 12:
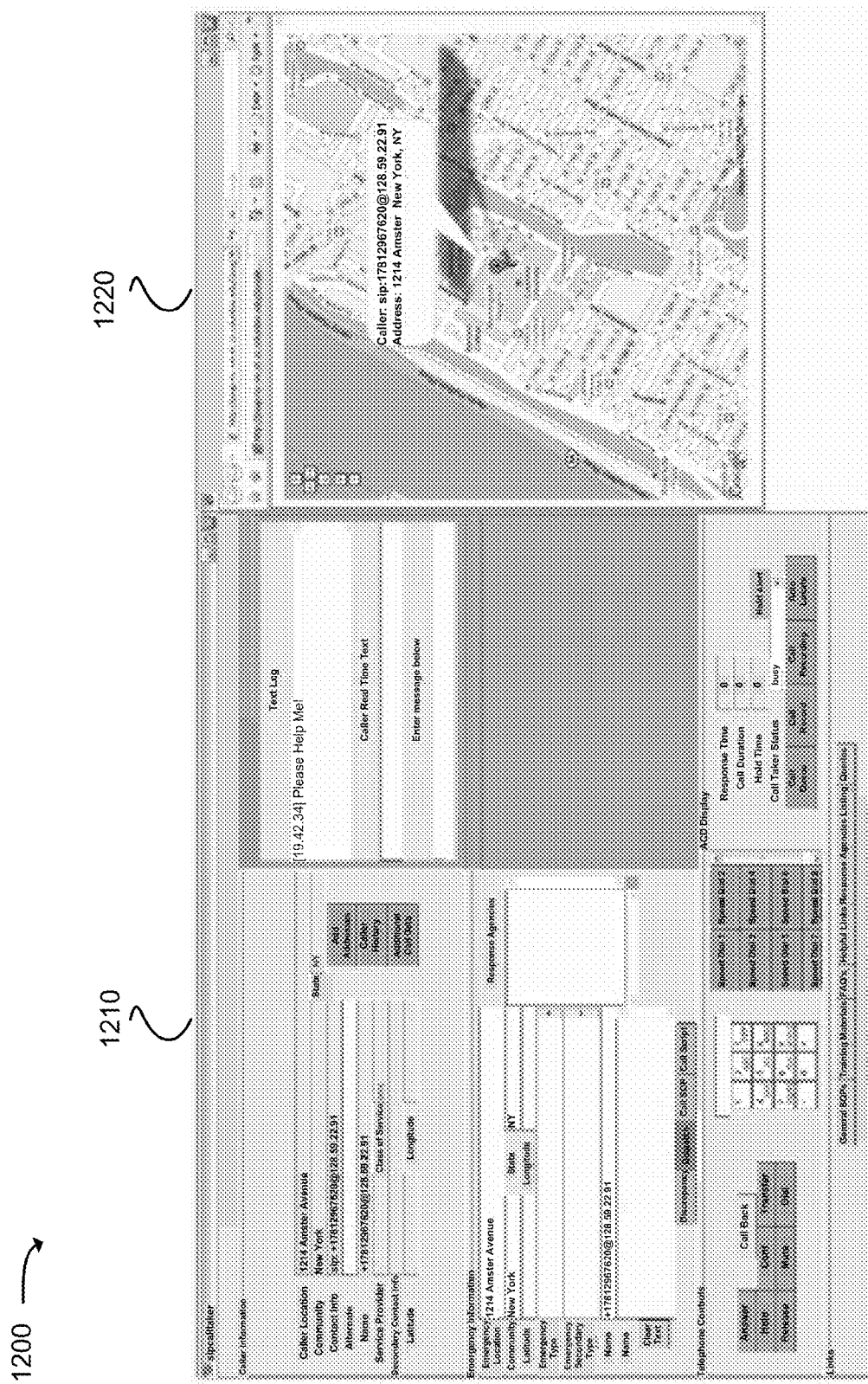
FIG. 12 is a diagram of an exemplary user interface that may be presented to an emergency call taker within the network of FIG. 8.

FIG. 12 is a diagram of an exemplary user interface 1200 that may be presented to an emergency call taker. As shown in FIG. 12, user interface 1200 may include an information window 1210 and a map window 1220. Information window 1210 may include information obtained from the SIP message, such as the location information regarding the geographic location of user device 110 and the text entered by the user of user device 110. Map window 1220 may include map information corresponding to the geographic location of user device 110.

Returning to FIG. 9, the call taker may interact with the information on emergency call taker device 330 and may respond to the user of user device 110. For example, the call taker may request that the user verify the location information, may request that the user clarify the nature of the emergency, may request that the user identify the type of assistance the user is requesting, may assure the user that help is on its way, or the like. To respond to the user, the call taker may send a SIP message back to user device 110, as shown as (10) in FIG. 9. The SIP message from emergency call taker device 330 may be received by IM gateway 820 (bypassing ESRP 210) and forwarded by IM gateway 820 to user device 110, as shown as (10) and (11), respectively, in FIG. 9.

The user and the call taker may exchange one or more additional text messages during the communication session established between user device 110 and emergency call taker device 330. The text messages may traverse the paths identified in FIG. 9.

The communication session may end in one of several ways. For example, the communication session may end when instructed by the user of user device 110, such as when the user closes dialog window 1020 (FIG. 10). Alternatively, the communication session may end when the soft session timer expires before a subsequent text message, from user device 110, is received by ESRP 210. In this case, ESRP 210 may erase information regarding the session from its memory (e.g., from session table 600). Alternatively, the communication session may end when the hard session is ended by the call taker. For example, the call taker may press a button, or otherwise indicate to emergency call taker device 330, to end the communication session with user device 110. In this case, emergency call taker device 330 may inform ACD 320 to end the hard session and, in response, ACD 320 may erase information regarding the session from its memory (e.g., from session table 700). Regardless of how the communication session is ended, information may be presented to the user and/or the call taker informing him/her of the fact that the communication has ended.

Figure 13:
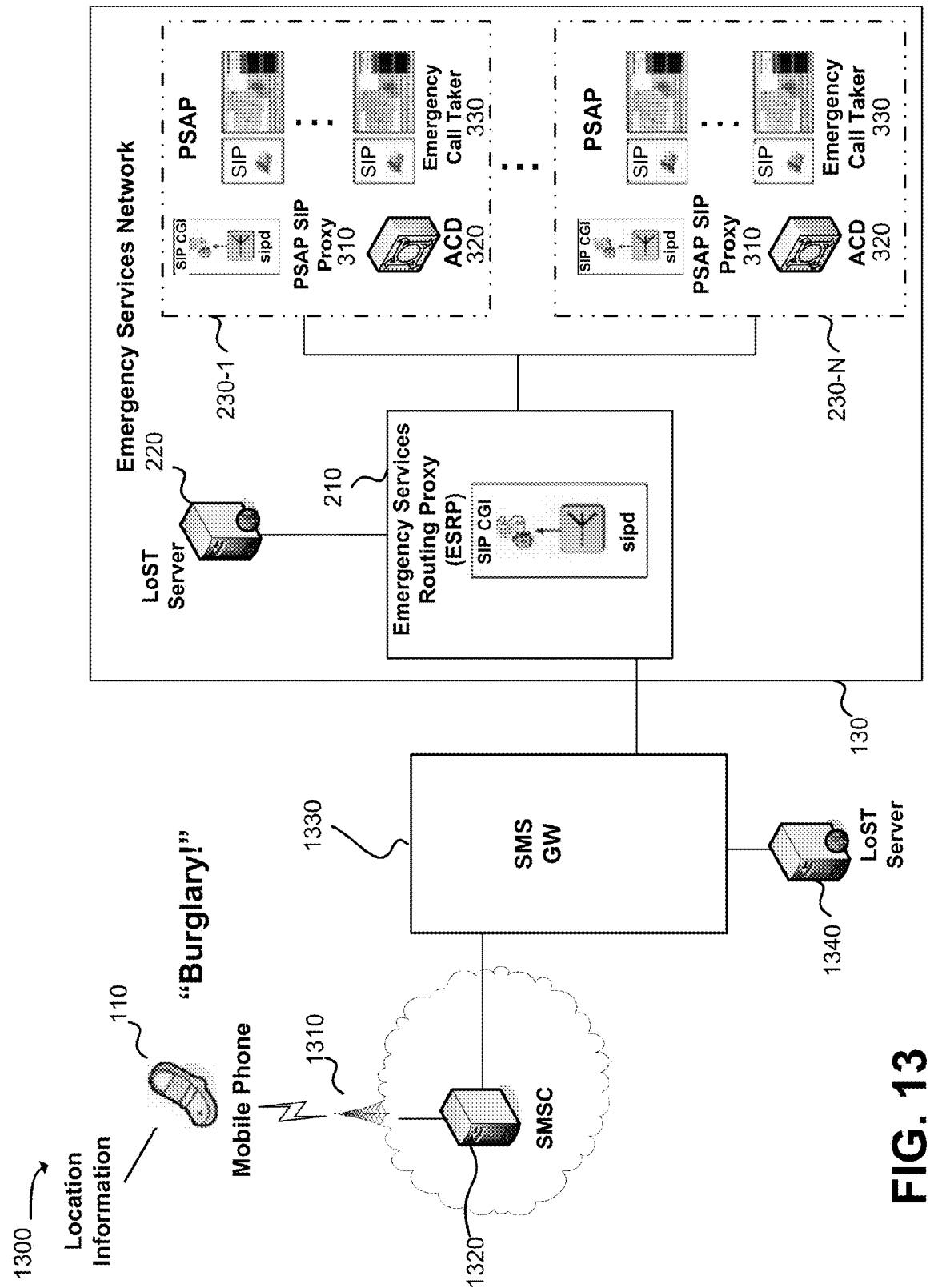
FIG. 13 is a diagram of an exemplary network that may provide short message service (SMS)-based emergency services.

FIG. 13 is a diagram of an exemplary network 1300 that may provide SMS-based emergency services. Network 1300 may include user device 110 connected to emergency services network 130. Emergency services network 130 may include similar devices as described above with regard to FIGS. 1-3. As shown in FIG. 13, network 1300 may also include additional devices, such as base station 1310, short message service center (SMSC) 1320, SMS gateway 1330, and LoST server 1340.

In the example of FIG. 13, assume that user device 110 takes the form of a mobile phone and includes a SMS application that has been modified to handle requests for emergency services. For example, the SMS application may be configured to determine the location of user device 110 and include the location information in a SMS message. In another implementation, not shown in FIG. 13, the location information may be obtained using a network-centric solution, such as using a MPC and a PDE. In this case, a network device, such as SMS gateway 1330, may include the location information in a text message from user device 110.

Base station 1310 may include a device, or a collection of devices, that may act as an access point for user device 110. Base station 1310 may receive radio frequency signals from user device 110 and transmit radio frequency signals to user device 110.

SMSC 1320 may include a device, or a collection of devices, that processes SMS messages. For example, SMSC 1320 may receive SMS messages from user device 110 and transmit the SMS message toward their destination. SMSC 1320 may also receive SMS messages intended for user device 110 and deliver the SMS messages to user device 110.

SMS gateway 1330 may include a device, or a collection of devices, that converts SMS messages into SIP messages, and vice versa. SMS gateway 1330 may also query LoST server 1340 for information regarding an emergency services network 130, or an ESRP 210, to which to forward a SMS message. SMS gateway 1330 may receive a SMS message from user device 110 and generate a SIP message from the information in the SMS message and include information, regarding the emergency services network 130, or ESRP 210, to which to send the SIP message, in the SIP message. SMS gateway 1330 may also receive a SIP message intended for user device 110, convert the SIP message into a SMS message, and send the SMS message to SMSC 1320 for forwarding to user device 110.

In one implementation, SMS gateway 1330 may start a soft session, similar to that described above for ESRP 210. For example, SMS gateway 1330 may record, in memory (e.g., within a session table similar to session table 600 (FIG. 6)), information regarding the SIP message, such as information identifying user device 110 and information identifying ESRP 210. SMS gateway 1330 may also set a timestamp value for the soft session. The session table maintained by SMS gateway 1330 may resemble and operate similar to the session table (e.g., session table 600) maintained by ESRP 210.

LoST server 1340 may include a device, or a collection of devices, that is responsible for mapping the geographic location of a user to an address of an emergency services network 130, or an ESRP 210 within an emergency services network 130. For example, LoST server 1340 may maintain a mapping table, or the like, that may facilitate the mapping of geographic locations to addresses of emergency services networks 130 or ESRPs 210. In one implementation, SMS gateway 1330 may send a request to LoST server 1340, where the request may include the geographic location of a user device 110 and request identification of one of emergency services networks 130, or ESRPs 210, that corresponds to the geographic location of user device 110. LoST server 1340 may identify an emergency services network 130, or ESRP 210, using an address, such as a SIP URI or another service contact URI, associated with the emergency services network 130, or ESRP 210.

Figure 14:
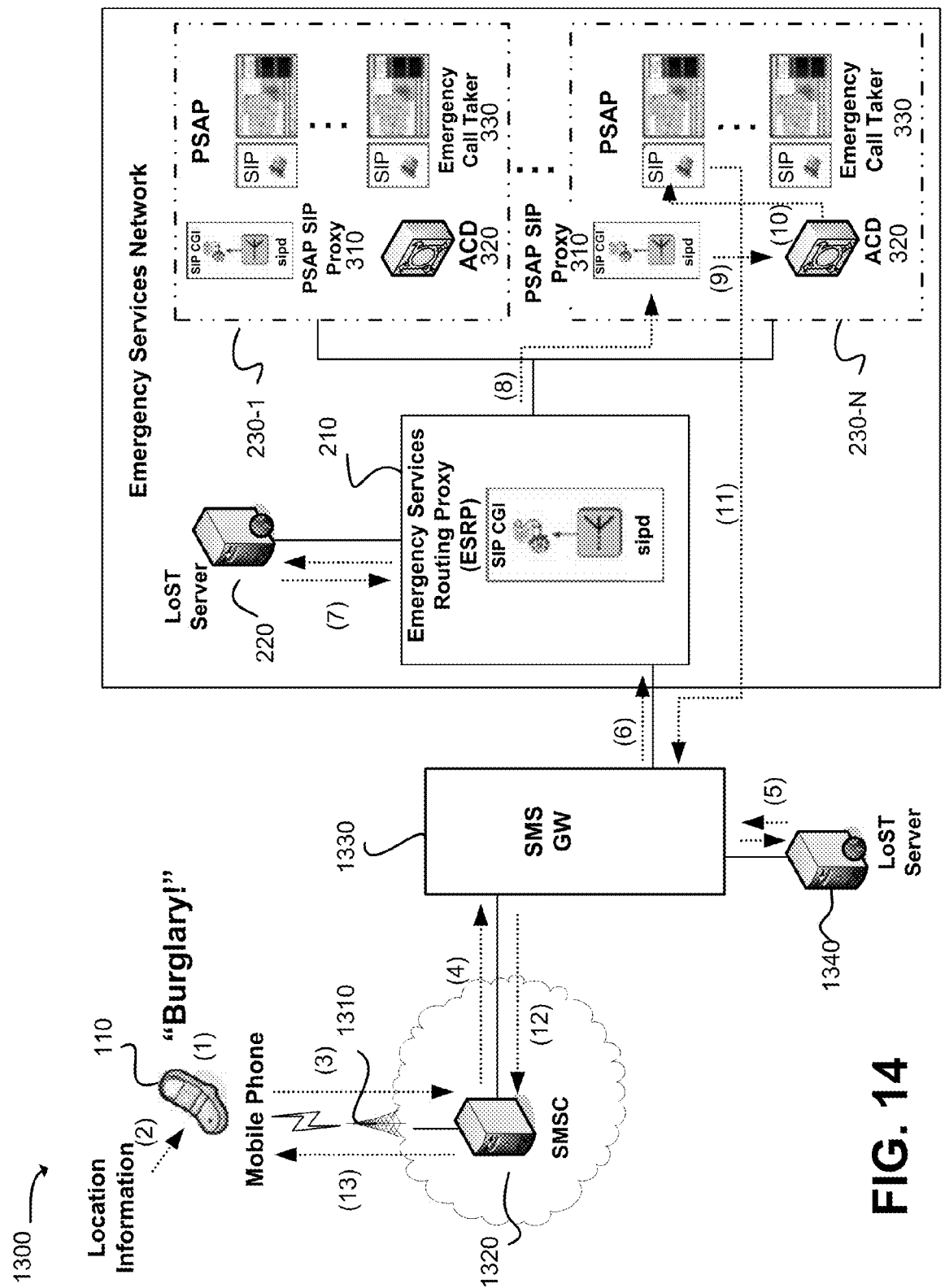
FIG. 14 is a diagram of exemplary operations that may be performed within the network of FIG. 13.

FIG. 14 is a diagram of exemplary operations that may be performed within network 1300. Assume that a user of user device 110 is in need of emergency services. The user may activate the SMS application on user device 110, initiate a request for emergency services, and enter text for the request, as shown as (1) in FIG. 14. The SMS application, or another application on user device 110, may obtain location information regarding the geographic location of user device 110, as shown as (2) in FIG. 14. The location information may be obtained from the user, from a GPS or GNSS receiver, from tower triangularization, or from another source.

Figure 15:
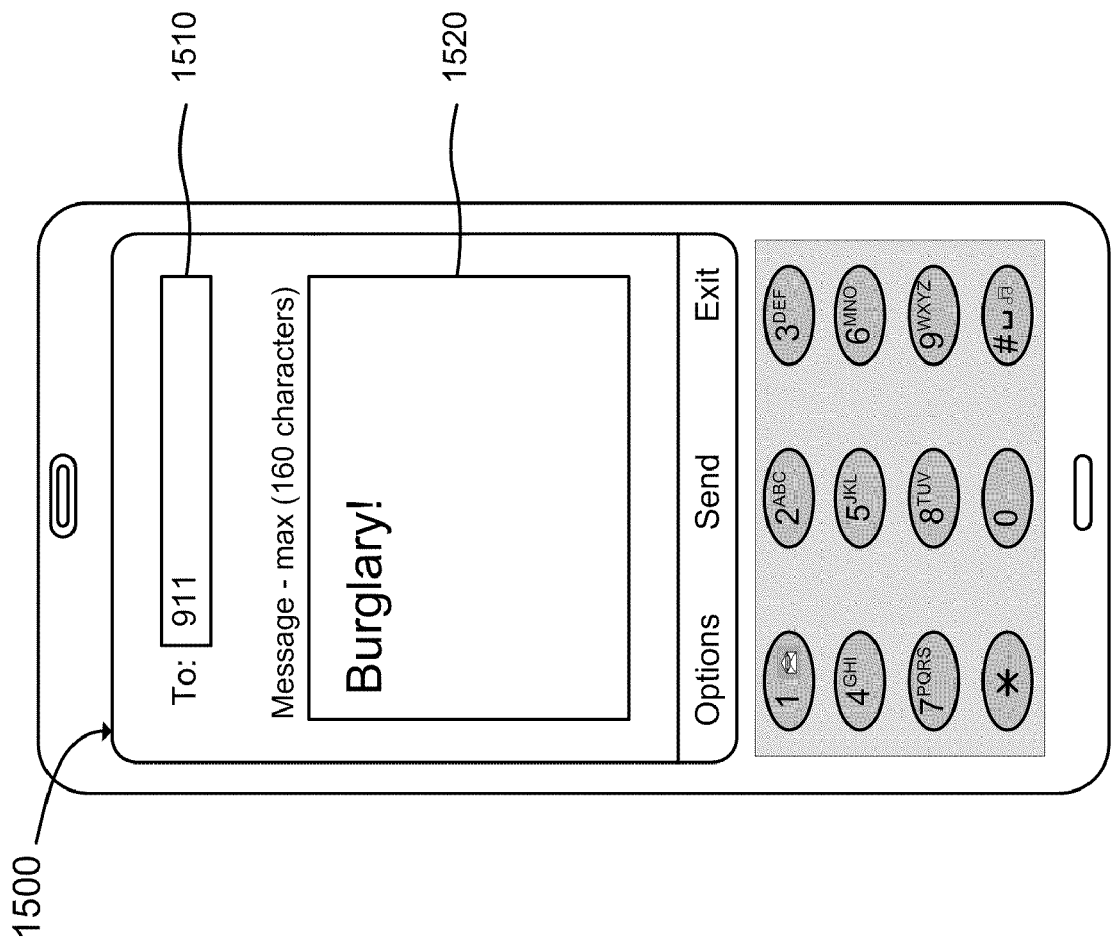
FIG. 15 is a diagram of an exemplary user interface that may be presented on a user device within the network of FIG. 13.

FIG. 15 is a diagram of an exemplary user interface 1500 that may be presented on user device 110. As shown in FIG. 15, user interface 1500 may include visual elements similar to standard SMS applications. For example, user interface 1500 may include an address section 1510 and a text entry section 1520. The user, of user device 110, may enter a special address into address section 1510 to identify the SMS message as a request for emergency services. The special address is shown as "911," but may take any form. Text entry section 1520 may accept text input from the user. The text input, received in text entry section 1520, may be used to form and send a text message.

Returning to FIG. 14, the SMS application, on user device 110, may generate a SMS message based on the text message entered by the user. The SMS message may be structured according to the SMS specification. The header-like part, of the SMS message, may include information regarding a destination of the SMS message (e.g., a general address for emergency services, such as 911) and information regarding the address (e.g., a telephone number) of user device 110. The SMS body or TP-User Data, of the SMS message, may include the text, entered by the user, and the location information, regarding the geographic location of user device 110. The location information may be represented as latitude and longitude coordinates, as GPS or GNSS coordinates, or using another geographic location representation. To conserve space in the SMS message, the location information may be compressed in some manner.

User device 110 may send the SMS message to base station 1310, as shown as (3) in FIG. 14. Base station 1310 may process the SMS message, if necessary, and send the SMS message to SMSC 1320, as also shown as (3) in FIG. 14. SMSC 1320 may receive the SMS message, process the SMS message, if necessary, and forward the SMS message to SMS gateway 1330, as shown as (4) in FIG. 14.

SMS gateway 1330 may receive the SMS message, as shown as (4) in FIG. 14. SMS gateway 1330 may query LoST server 1340 based on the location information regarding the geographic location of user device 110. For example, SMS gateway 1330 may send a request to LoST server 1340 to identify an emergency services network 130, or an ESRP 210, to which to send the request for emergency services, as shown as (5) in FIG. 14. The query, to LoST server 1340, may include the location information regarding the geographic location of user device 110. LoST server 1340 may perform a look-up based on the location information to identify the appropriate emergency services network 130, or ESRP 210, to handle the request for emergency services.

SMS gateway 1330 may generate a SIP message based on the SMS message and the information obtained from LoST server 1340. The SIP message may include a header and a body, as shown, for example, in FIG. 11. In one implementation, the request-URI and the SIP To header fields may be set as, for example, urn: service:sos, in order to distinguish an emergency SIP message from non-emergency SIP messages. The SIP From header field may be set as a combination of the address (e.g., a telephone number) of user device 110 and the address (e.g., a SIP URI) of SMS gateway 1330 (e.g., sip:+19171234567@10.0.1.2). The SIP Route header field may be set as the address (e.g., a SIP URI) of emergency services network 130, or ESRP 210, to which the SIP message is to be sent. The text, entered by the user, and the location information, regarding the geographic location of user device 110, may be inserted into the SIP message body. As described above, the location information may be embedded in the SIP message body as PIDF-LO data. The SIP Geolocation header field may also include information to indicate that the SIP message includes location information.

SMS gateway 1330 may forward the SIP message to ESRP 210 within emergency services network 130, as shown as (6) in FIG. 14. As described above, SMS gateway 1330 may also start a soft session. For example, SMS gateway 1330 may record, in memory, information regarding the SIP message, such as information identifying user device 110 and information identifying ESRP 210. SMS gateway 1330 may also set a timestamp value for the soft session.

ESRP 210 may receive the SIP message and identify the SIP message as a request for emergency services. ESRP 210 may send a request to LoST server 220 for the identification of a PSAP 230 to which to send the SIP message, as shown as (7) in FIG. 14. LoST server 220 may receive the request and perform a look-up operation based, for example, on the location information. LoST server 220 may identify a PSAP 230 based, for example, on the location information, and return information identifying PSAP 230 to ESRP 210, as shown as (7) in FIG. 14.

As described above, ESRP 210 may also start a soft session. For example, ESRP 210 may record, in memory (e.g., within session table 600 (FIG. 6)), information regarding the SIP message, such as information identifying user device 110 and information identifying PSAP 230. ESRP 210 may also set a timestamp value for the soft session.

ESRP 210 may route the SIP message to the identified PSAP 230, as shown as (8) in FIG. 14. The SIP message may be received by SIP proxy 310 of the identified PSAP 230, as shown as (8) in FIG. 14. SIP proxy 310 may forward the SIP message to ACD 320, as shown as (9) in FIG. 14. ACD 320 may process the SIP message to identify an appropriate one of emergency call taker devices 330 to handle the SIP message using, for example, local policy rules. ACD 320 may also start a hard session by, for example, storing information regarding the SIP message, such as information identifying user device 110 and information identifying emergency call taker device 330, in memory (e.g., within session table 700 (FIG. 7)).

ACD 320 may forward the SIP message to emergency call taker device 330, as shown as (10) in FIG. 14, thereby establishing a communication session between user device 110 and emergency call taker device 330. Emergency call taker device 330 may receive the SIP message and present information regarding the SIP message to the call taker. Initially, emergency call taker device 330 may request the call taker to indicate the call taker's acceptance of the SIP message. Emergency call taker device 330 may present detailed information regarding the SIP message, such as shown in FIG. 12.

The call taker may interact with the information on emergency call taker device 330 and may respond to the user of user device 110. For example, the call taker may request that the user verify the location information, may request that the user clarify the nature of the emergency, may request that the user identify the type of assistance the user is requesting, may assure the user that help is on its way, or the like. To respond to the user, the call taker may send a SIP message back to user device 110, as shown as (11) in FIG. 14. The SIP message, from emergency call taker device 330, may be received by SMS gateway 1330 (bypassing ESRP 210), converted to a SMS message, and sent to SMSC 1320, as shown as (12) in FIG. 14. SMSC 1320 may process the SMS message, if necessary, and send the SMS message to user device 110, as shown as (13) in FIG. 14.

The user and the call taker may exchange one or more additional text message during the communication session established between user device 110 and emergency call taker device 330. The text messages may traverse the paths identified in FIG. 14.

The communication session may end in one of several ways. For example, the communication session may end when the soft session timer expires before a subsequent text message, from user device 110, is received by SMS gateway 1330 and/or ESRP 210. In this case, SMS gateway 1330 and/or ESRP 210 may erase information regarding the session from its memory (e.g., from session table 600). Alternatively, the communication session may end when the hard session is ended by the call taker. For example, the call taker may press a button, or otherwise indicate to emergency call taker device 330, to end the communication session with user device 110. In this case, emergency call taker device 330 may inform ACD 320 to end the hard session and, in response, ACD 320 may erase information regarding the session from its memory (e.g., from session table 700). Regardless of how the communication session is ended, information may be presented to the user and/or the call taker informing him/her of the fact that the communication has ended.

Implementations, described herein, may facilitate the use of text-based messages to request emergency services. These implementations may maintain session information, at one or more locations in the network, so that subsequent text messages from a particular user device get routed to the same call taker as the first (i.e., initial) text message from that user device.

Two exemplary implementations have been described in terms of IMs and SMS messages. In other implementations, another form of real-time, or near-real-time, text messages may be used.

The foregoing description provides illustration and description, but is not intended to be exhaustive or to limit the invention to the precise form disclosed. Modifications and variations are possible in light of the above teachings or may be acquired from practice of the invention.

For example, while FIG. 9 shows the IM application determining the geographic location of user device 110 and identifying the appropriate emergency services network 130, or ESRD 210, after the user initiates a request for emergency services, this need not be the case. For example, the IM application, or another application operating on user device 110, may perform these operations prior to the user initiating a request for emergency services.

Also, while FIG. 14 shows the SMS application determining the geographic location of user device 110, this need not be the case. For example, the geographic location may be determined by a network device, such as the SMS gateway. In this case, the SMS gateway may include, or communicate with, specialized network components, such as a MPC and a PDE, and query user device 110 to obtain the geographic location of user device 110.

Also, SIP has been described as the protocol used to transmit text messages to and from emergency services network 130. In another implementation, a different protocol, or a combination of protocols, may be used.

Further, various user interfaces have been described with regard to FIGS. 10, 12, and 15. In other implementations, these user interfaces may include additional, fewer, different, or differently arranged items of information. Thus, implementations described herein are not tied to any specific arrangement of items of information on a screen of a user device 110 or an emergency call taker device 330.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more devices, a text message that includes information identifying a user device, information identifying a geographic location of the user device, and information identifying a particular emergency services network of a plurality of emergency services networks;
   establishing, by the one or more devices and based on the text message, a text-based communication session between the user device and a call taker device within the particular emergency services network;
   storing, by the one or more devices, session information regarding the text-based communication session;
   receiving, by the one or more devices, a subsequent text message; and
   transmitting, by the one or more devices, the subsequent text message to the call taker device based on the session information.

2. The method of claim 1, where the received text message is generated by:
   receiving, from a user of the user device, text input via an instant messaging application operating on the user device,
   identifying a geographic location of the user device,
   identifying the particular emergency services network based on the geographic location of the user device, and
   generating the text message based on the text input, information identifying the geographic location of the user device, and information identifying the particular emergency services network.

3. The method of claim 1, where the received text message is generated by:
   receiving, from a user of the user device, text input via a short message services application operating on the user device,
   identifying a geographic location of the user device,
   identifying the particular emergency services network based on the geographic location of the user device, and
   generating the text message based on the text input, information identifying the geographic location of the user device, and information identifying the particular emergency services network.

4. The method of claim 1, where storing the session information includes:
   storing information identifying the user device,
   storing information identifying a public safety answering point associated with the call taker device, and
   storing a timestamp value reflecting a time at which the text message is received.

5. The method of claim 4, further comprising:
   resetting the timestamp value to a time at which the subsequent text message is received; and
   ending the text-based communication session when a particular amount of time elapses, from the time associated with the timestamp value, before the subsequent text message is received.

6. The method of claim 1, where storing the session information includes:
   storing information identifying the user device, and
   storing information identifying a device within the particular emergency services network.

7. The method of claim 1, further comprising:
   receiving an instruction from the call taker device to end the text-based communication session; and
   ending the text-based communication session based on the instruction.

8. The method of claim 1, further comprising:
   receiving a response text message from the call taker device; and
   sending the response text message to the user device.

9. The method of claim 1, further comprising:
   receiving information from the call taker device to end the text-based communication session, and
   deleting, based on receiving the information from the call taker device to end the text-based communication session, the stored session information.

10. A system comprising:
    one or more devices to:
    receive
    a text message generated based on text input at a user device, information identifying a geographic location of the user device, and information identifying a particular emergency services network, route the text message to a call taker device within the particular emergency services network to establish a communication session between the user device and the call taker device, store session information regarding the communication session, receive a subsequent text message from the user device, and transmit the subsequent text message to the call taker device based on the session information.

11. The system of claim 10, where the text message is a session initiation protocol (SIP) message.

12. The system of claim 10, where the text input is part of a short message services (SMS) message, and where the one or more devices are further to convert the SMS message into a session initiation protocol (SIP) message.

13. The system of claim 10, where, when storing the session information, the one or more devices are to:

store information identifying the user device, store information identifying a device within the particular emergency services network, and store a timestamp value reflecting a time at which the text message is received.

14. The system of claim 13, where the one or more devices are further to:

reset the timestamp value to a time at which the subsequent text message is received, and end the communication session when a particular amount of time elapses, from the time associated with the timestamp value, before the subsequent text message is received.

15. The system of claim 10, where, when storing the session information, the one or more devices are to:

store information identifying the user device, and store information identifying a device within the particular emergency services network.

16. The system of claim 10, where the one or more devices are further to:

receive an instruction from the call taker device to end the communication session, and end the communication session based on the instruction.

17. The system of claim 10, where the one or more devices are further to:

receive a response text message from the call taker device, and send the response text message to the user device.

18. The system of claim 10, where the one or more devices are further to:

receive information from the call taker device to end the text-based communication session, and delete, based on receiving the information from the call taker device to end the text-based communication session, the stored session information.

19. A device comprising:

a processor to:

receive a text message that includes:

text input, associated with a request for emergency services, entered via an instant messaging application or a short message services application operating on a user device, and information identifying a geographic location associated with the user device, identify one of a plurality of devices to forward the text message, establish, based on the text message, a text-based communication session between the user device and the one of the plurality of devices, store session information associated with the text-based communication session, forward the text message to the one of the plurality of devices, receive a subsequent text message, and forward the subsequent text message to the one of the plurality of devices based on the session information.

20. The device of claim 19, where, when storing the session information, the processor is further to:

store information identifying the user device, store information identifying the one of the plurality of devices, and store a timestamp value reflecting a time at which the text message is received.

21. The device of claim 20, where the processor is further to:

reset the timestamp value to a time at which the subsequent text message is received, and delete the session information when a particular amount of time elapses, from the time associated with the timestamp value, before the subsequent text message is received.

22. The device of claim 19, where the processor is further to:

receive a response text message, and send the response text message to the user device.

23. The device of claim 19, where the processor is further to:

receive an instruction from the one of the plurality of devices to end the text-based communication session; and end the text-based communication session based on the instruction.

24. The device of claim 19, where the processor is further to:

receive information from the one of the plurality of devices to end the text-based communication session, and delete, based on receiving the information from the one of the plurality of devices to end the text-based communication session, the stored session information.

* * * * *